Truncated for brevity in this context 3,371,078
RECOVERY OF POLYOLEFINS
James D. Owens, Texas City, Tex., assignor to Monsanto Company, St. Louis, Mo., a corporation of Delaware
Filed Aug. 24, 1964, Ser. No. 391,615
4 Claims. (Cl. 260—94.9)

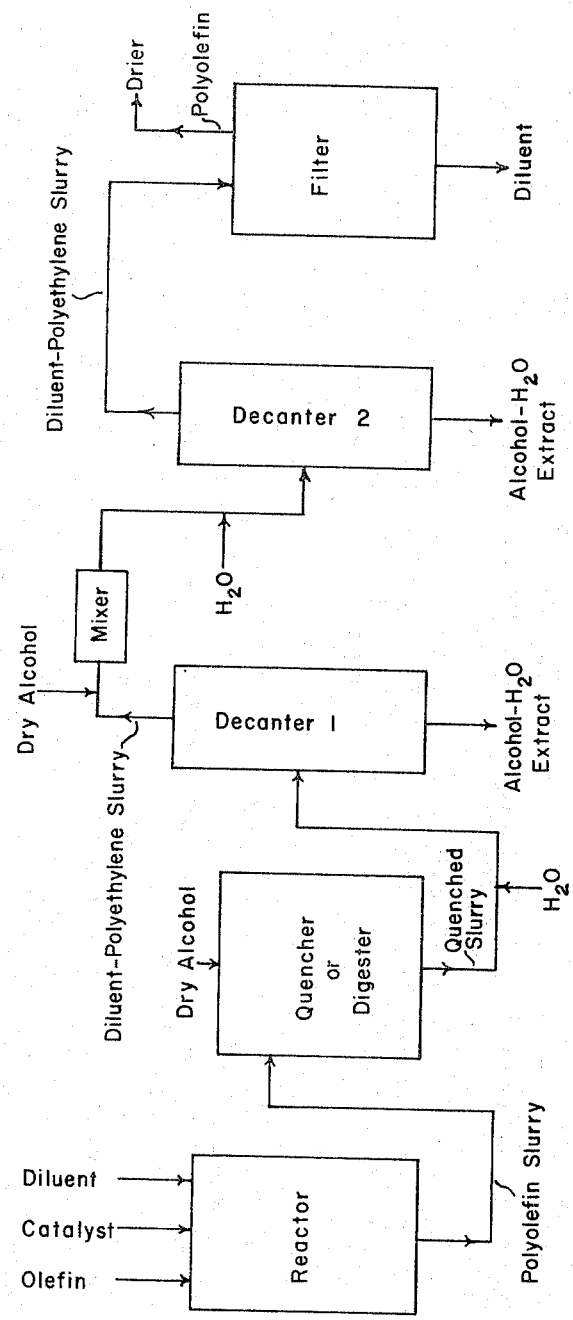

This invention relates to the polymerization of olefins and to an improved method for recovering polyolefins from mixtures produced by the polymerization of olefins in the presence of so-called Ziegler catalysts. More particularly, it relates to a method for removing the greater part of the catalyst residues from such polyolefins to obtain products having improved characteristics with respect to discoloration and degradation.

A process of considerable commercial importance is that whereby ethylene and/or other polymerizable olefinic hydrocarbons may be polymerized at low temperatures and pressures to yield products of high molecular weight superior in many respects to those produced by the high-pressure techniques previously practiced in the art. This process has been made possible through the agency of a type of catalyst developed by Dr. Karl Ziegler of the Max Planck Institute at Mulheim, Ruhr, Germany, and has come to be commonly termed the "Ziegler process," while the catalysts employed are commonly referred to as "Ziegler catalysts." Many variations of the catalyst have been disclosed but probably the preferred groups are those described in Belgian Patents Nos. 533,362 and 534,792, the disclosures of which are incorporated herein by reference, namely, catalysts prepared by the interaction of strong reducing agents such as organometallic compounds like metal alkyls with a compound of a metal of Group IV–B, V–B, and VI–B of the Periodic Table of the elements including thorium and uranium and especially the halides of titanium and zirconium.

As the process is ordinarily conducted, the catalyst is suspended in a suitable liquid organic medium or inert diluent such as hexane, benzene, and the like, and the olefin is bubbled through the system at a temperature anywhere in the range from 0° to 100° C. and at relatively low pressures. The olefin polymer or copolymer formed in such systems is generally insoluble in the liquid organic medium and thus is usually deposited or dispersed as a slurry of fine solid particles in the liquid organic medium. Upon completion of the reaction, the reaction, the polymer is recovered by first destroying the catalyst by contacting or quenching it with an alcohol and then separating the solid polymer from the reaction mixture by filtration or centrifugation. After the polymer is removed from the reaction mixture, it is usually washed with a suitable solvent in order to remove final traces of the catalyst residues and the reaction medium. Alkyl alcohols can be used for this purpose. After washing, the polymer is dried by any convenient method.

The polyolefins obtained have superior and highly desirable properties. Examples of particularly valuable solid polymers produced by the Ziegler process are polyethylene and polypropylene, especially the so-called isotactic or crystalline polypropylene. However, the Ziegler catalysts have the disadvantage of leaving metallic residues intimately admixed with, occluded in, and, perhaps, bonded to the polymers. The presence of these metallic residues tends to impart undesirable characteristics to the polymers. They lead, for example, to degradation and discoloration of the polymers when they are heated or when they are exposed to light, particularly sunlight. When subsequently molded, melt fabricated, or otherwise shaped in the presence of heat, the polymers become darker than is desirable and consequently their utility is seriously restricted. While it has been found that antioxidants and like compounds may sometimes be employed to stabilize polymeric products against the effects of degradation induced by exposure to heat and light, the effectiveness of such agents is often greatly reduced or even nullified in the presence of such metallic oxidation catalysts as are found in the catalyst residues remaining in the polymers produced by the Ziegler process: In addition to detrimental color effects arising from molding, the electrical properties, particularly the electrical insulating properties of the molded products, are also adversely affected. Further, the catalyst residues retained in the polymer will cause corrosion of process equipment employed in the fabrication of the polymer. Thus, it will be seen that it is imperative to remove these metal-containing catalyst residues from the polymers.

A number of methods for removing the Ziegler catalyst residues have been proposed. As previously mentioned, the most common technique in the art is that of quenching of the catalyst in the reaction medium with an alcohol and subsequently washing the filtered polymer with fresh alcohol or some other washing agent. In the quenching or digestion step, a chemical reaction occurs which results in dissolution of the metal-to-polymer bond and produces esters of the metals in the catalyst which are soluble in the added alcohol. Subsequent separation of the alcohol-extract layer will thus remove the greatest part (80–85%) of the catalyst residues. The esters formed, however, are strongly occluded or adsorbed on the polymer surface and while they are in general also soluble in the liquid organic reaction medium as well as in the alcohol, they do not readily migrate into the reaction medium phase and thus must be physically removed from the surface of the polymer particles. Such physical removal can be affected as disclosed in the art by filtering off the solid polymer and by repeatedly washing it with alcohol, water, solvents or the like but a prohibitive amount of the washing agent is required to reduce the residues to the required low level resulting in time-consuming operations and high processing costs. Also, such methods do not consistently lead to the production of polyolefins which meet the specifications set up in the market place for an acceptable product with respect to catalyst residues.

It has now been discovered that the low rate of mass transfer of solubilized catalyst residues from the polymer surface into the reaction medium or diluent phase can be overcome by treating the diluent-polyolefin slurry from the quenching operation with a nominal amount of dry alcohol in a single stage and then subjecting the resulting mixture to a phase separation whereby the metallic residues are substantially eliminated and the resulting polymer product greatly improved. This is indeed surprising in view of the fact that the use of an equivalent additional amount of alcohol in the quenching step will not accomplish the same result.

The process of the invention will be better understood by reference to the accompanying drawing which is a flow diagram of an embodiment of the invention. As shown in the drawing, olefin, catalyst and an inert liquid organic reaction medium or diluent are introduced into the polymerization reactor wherein a slurry of polyolefin in the diluent is produced. Thereafter, according to the present invention, solid polyolefin is recovered from the polyolefin slurry or crude polymerizate by (1) contacting the catalyst in the reaction mixture after the polymerization has taken place and before any substantial removal of the polymer from the reaction mixture with an anhydrous alkyl alcohol containing from 1 to 8 carbon atoms at a temperature from about 80° C. to about 105° C. in a quencher or digester to destroy the catalyst; (2) adding water or a "wet" alcohol to the quenched slurry to form a diluent-polyolefin slurry phase and an aqueous alcohol phase rich in extracted catalyst residues (80–85%); (3) separating said phases as in decanter 1; (4) contacting said diluent-polyolefin slurry phase with a nanhydrous alkyl alcohol containing from 1 to 8 carbon atoms at temperatures from about 25° to about 50° C. to yield a slurry having a single liquid phase; (5) thereafter adding water or a "wet" alcohol to said slurry to form two phases—a diluent-polyolefin slurry phase and an aqueous alcohol extract phase; (6) separating said phases as in decanter 2; (7) filtering the diluent-polyolefin slurry phase to obtain the solid polyolefin, and (8) drying said polyolefin.

The present invention is broadly applicable to all Ziegler-type solid polymers, i.e., all solid polymers prepared by polymerizing a monomer or mixture of monomers in the presence of a Ziegler-type catalyst. It is particularly suited for use with polymers prepared by polymerizing ethylenically unsaturated hydrocarbons or olefins such as ethylene, propylene, butene-1, heptene-1, octadecene-1, dodecene-1, 3 - methylbutene, 4-methylbutene-1, styrene, vinyl cyclohexene and the like either alone, with each other, or with other monomers especially diolefins such as butadiene, isoprene piperylene, cyclopentadiene, 1,4-pentadiene and the like.

As mentioned previously, the Ziegler catalyst useful for the polymerization of the monomers mentioned in the foregoing paragraph are those comprising the product formed from the reaction of a compound of a transition metal selected from Group IV–B, V–B, or VI–B of the Periodic Table of the elements with a metallic reducing agent. Preferably, the transition metal compounds employed are the compounds of titanium and zirconium with the halides being especially preferred although oxyhalides, organic salts or complexes of these elements can be used. The titanium or zirconium in the compounds employed should be in a valence form higher than the lowest possible valence. The tetrahalides are especially preferred although the dihalides, trihalides, mixtures of di-, tri-, and tetrahalides, etc., can be used. Titanium or zirconium compounds other than the halides which can be employed include alcoholates, alkoxides or esters such as titanium tetramethoxide (also called tetramethyltitanate), titanium triethoxide, tripropoxytitanium chloride, zirconium tetra-n-butoxide, or complexes such as zirconium acetylacetonate, $K_2TiF_6$, or salts of organic acids such as the acetates, benzoates, etc., of titanium and zirconium.

Preferred as metallic reducing agents are organoaluminum compounds such as triethylaluminum, tributylaluminum, triisobutylaluminum, tripropylaluminum, triphenylaluminum, trioctylaluminum, tridodecylaluminum, dimethylaluminum chloride, diethylaluminum chloride, dipropylaluminum fluoride, diisobutylaluminum chloride, diisobutylaluminum hydride, diethylaluminum chloride, and the like. Mixtures of the foregoing types of aluminum compounds can also be employed. The total reaction mixtures obtained in the formation of such compounds, i.e., by treatment of metallic aluminum with alkyl halides resulting in the formation of such mixtures as dialkylaluminum halides plus monoalkylaluminum dihalides, termed alkylaluminum sesquihalides, are also suitable. In addition to the organoaluminum compounds organometallic compounds of magnesium or zinc can be used. Also suitable are other reducing agents such as alkali metals, e.g., lithium, sodium, potassium; alkali hydrides, e.g., lithium hydride, sodium hydride; complex alkali aluminum and alkali boron hydrides, e.g., lithium aluminum hydride; complexes of alkali metal hydrides with boron triaryls or boric acid esters or boronic acid esters and the like.

As employed commercially, such Ziegler catalysts are preferably formed by the reaction of titanium tetrachloride with an aluminum compound selected from the class consisting of aluminum trialkyls, dialkyl aluminum halides and dialkyl aluminum hydrides. However, the process of the present invention is not limited in its applicability to polymerization processes in which such preferred Ziegler catalysts are employed.

The quantities of catalytic components can be varied considerably. The mole ratio of reducing agent to transition metal compound can be in the range of from 0.3:1 to 10:1, on up to 15:1 or even higher. With an organoaluminum compound and a titanium halide the preferred Al:Ti mole ratios are those between 1:3 and 5:1.

The amount of catalyst required is comparatively small. Generally, amounts from 0.1 to 5.0% by weight based on the total weight of monomer charged are satisfactory although amounts as small as 0.01% are sometimes permissible and larger amounts up to, say 20% can be employed.

The catalyst is suspended for the polymerization reaction in an inert liquid reaction medium or diluent sometimes referred to as a liquid slurrying medium. Preferably, the diluent should be low-boiling so that trace amounts left on the polymers can be removed conventionally in a drying step. Suitable for use as inert liquid reaction media or diluents are saturated aliphatic and alicyclic hydrocarbons, aromatic hydrocarbons, halogenated hydrocarbons, and saturated ethers. Of these, the hydrocarbon solvents such as pentanes, n-hexane, n-heptane, n-octane and the various isomeric hexanes, heptanes and octanes, cyclohexane, methylcyclopentane, dodecane and industrial solvents composed of saturated and/or aromatic hydrocarbons such as kerosene, naphthas and the like are more generally used, with the saturated aliphatic hydrocarbons having from about 5 to about 12 carbon atoms being preferred. However, benzene, toluene, ethylbenzene, cumene, Decalin, ethylene dichloride, chlorobenzene, diethyl ether, ortho-dichlorobenzene, dibutyl ether and the like can be used. The quantity of liquid reaction medium or diluent used is subject to substantial variation. The amount may be kept low in the reaction mixture such as from 0.1 to 0.5 part by weight of diluent per part by weight of total polymer produced. However, it is often helpful in obtaining sufficient contact between monomer and catalyst and in aiding removal of heat of reaction to employ larger amounts of the inert liquid suspending medium or diluent, for example, from about 4 to about 30 parts by weight of the liquid medium or diluent per part by weight of total polymer produced.

So-called polymerization "modifiers" or chain-transfer agents can be employed in the polymerization if desired to obtain certain properties in the polyolefins which such modifiers or chain-transfer agents may impart. Examples of compounds in general used in the art for this purpose are aliphatic alcohols containing one to ten carbon atoms and preferably three to five carbon atoms such as methanol, propanol, isobutanol, hexanol and decanol; aliphatic saturated ketones containing three to ten carbon atoms and preferably three to five carbon atoms such as acetone, diethyl ketone, methyl isopropyl ketone and the like; saturated aliphatic aldehydes containing one to eight carbon atoms and preferably two to five carbon atoms such as formaldehyde, acetaldehyde, butyraldehyde and the like; saturated hydrocarbons such as ethane, propane, cyclohexane and the like; aromatic hydrocarbons such as toluene, xylene and the like; chlorinated hydrocarbons such as chloroform, carbon tetrachloride and the like, and hydrogen and acetylene.

The polymerization reaction can be conducted over a wide range of temperatures from 0° to 100° C. and higher if desired. Preferably, reaction temperature is maintained at about 65–90° C. Likewise, while atmospheric pressure or a pressure slightly above atmospheric is preferred, subatmospheric or superatmospheric pressures can be used. The applicability of the present process is not limited to any special catalyst, or catalyst suspending medium or particular conditions of temperature and pressure under which the polymerization reaction itself is carried out.

In practicing the process of the present invention, any anhydrous or substantially anhydrous (i.e., containing <25 parts of water per million parts of alcohol) alkyl alcohol containing from 1 to 8 carbon atoms can be employed for quenching or destruction of the catalyst after the polymerization is complete and before separation of the polymer from the reaction mixture. Of the suitable alcohols, methyl alcohol, ethyl alcohol, propyl alcohol, isopropyl alcohol, n-butyl alcohol, tert-butyl alcohol, isobutyl alcohol, amyl alcohol, hexyl alcohol, octyl alcohol, and the like, methyl alcohol is the preferred quenching agent. The amount of alcohol used for quenching is critical only in the sense that it must be sufficient to destroy completely all catalyst activity and may be varied widely from about 1% to about 300% of the weight of the reaction mixture or polyolefin slurry being treated. The optimum amount for use will vary according to the quantity of catalyst present in the polymerizate. Generally, amounts from about 5% to about 25% by weight of the polymer slurry are satisfactory but the amount can be controlled as desired to provide an amount of alcohol sufficient to form a slurry of satisfactory fluidity while remaining within the bounds of economical operations.

The temperature at which the quenching reaction is effected is critical. In order to obtain satisfactory results with the process of the invention, temperatures in this step should be maintained in the range from about 80° to about 105° C. with temperatures from about 90° to 100° C. being the preferred ones. The time of treatment can be varied. As short a period of time as 10 minutes can give satisfactory results and one hour is adequate in most instances although it may be practical on some occasions to allow the quenching action to continue for several hours. Preferred quenching times are those from about 30 minutes to about 60 minutes. Air and water are excluded during the quenching operation and an inert atmosphere is preferably maintained during this process step.

It is within the scope of the invention to employ, if desired, so-called quenching or digestion aids, i.e., compounds which increase the efficiency of the chemical action by which the catalyst is destroyed. Exemplary of such compounds are, for example: organic peroxygen compounds such as aliphatic and aromatic peroxy acids representative of which are performic acid, peracetic acid, perbenzoic acid, perphthalic acid and the like, peroxy esters such as di-tert-butyl peroxalate, tert-butyl-perpivalate and the like, acyl peroxides such as benzoyl peroxide, diisobutyryl peroxide, lauroyl peroxide, caprylyl peroxide and the like, and dialkyl peroxy dicarbonates such as isopropyl peroxydicarbonate and tert-butyl peroxydicarbonate; metallic salts such as stannic chloride; ferric ammonium sulfate; and hydroxylamine and N-alkylhydroxylamines and the like. When they are used, only minor amounts of such compounds are employed.

After quenching is complete, the quenched slurry or digested reaction mixture is contacted with water to effect phase separation of the alcohol containing the solubilized residues from the diluent-polyolefin slurry as by a conventional decantation operation. The amount of water employed determines the density of the alcohol phase and the rate of separation of the two phases. Generally, satisfactory separation is effected with amounts of water from about 1% to about 10% by weight of the liquid in the quenched slurry or reaction mixture and optimum separation in reasonably-sized equipment is achieved with from about 2.5% to about 5% water. While most efficient phase separation is achieved with water itself, it is possible in this step to substitute a so-called "wet" alcohol, i.e., an 80–20 alcohol-water mixture which is obtained in a subsequent phase-separation step and can be recycled to this point in the process.

With the separation of the diluent-polyolefin slurry from the aqueous alcohol extract rich in catalyst residues by decantation, approximately 80–85% of the catalyst residues are removed from the polymer. To obtain substantially complete removal, the diluent-polyolefin slurry from the decanter is then contacted in the next essential step in the process with an anhydrous or substantially anhydrous (<25 p.p.m. $H_2O$) alkyl alcohol. This may suitably be any alkyl alcohol containing 1 to 8 carbon atoms but preferably is the same alcohol which is employed in the quenching step. This contacting which produces a slurry of the polyolefin in a single liquid phase is effected at temperatures from about 25° to about 50° C. employing amounts of alcohol from about 5% to about 15% by weight of the diluent in the slurry. Preferably, the contacting is conducted at temperatures from about 30° to about 40° C. in some suitable type of mixing equipment such as a mixing tank using from about 9 to about 12% of the alcohol. However, a mixer is not required since mixing in ordinary transfer through pipes from the outlet of the first separator or decanter to the inlet of the second separator or decanter is of sufficient intensity and time to remove effectively the occluded solubilized catalyst residues from the surface of the polymer particles.

The second phase separation of the diluent-polyolefin slurry from the alcohol used for treating it is effected in a second separator which is suitably a decanter in substantially the same manner as the first phase separation described above. Water is added to the alcohol-treated slurry in an amount from about 1% to about 10% by weight of the liquid in the mixture and preferably from about 2.5% to about 5%, and two phases are again formed, a diluent-polyolefin phase and an aqueous alcohol phase. These phases are separated as by decantation, for example, with the aqueous alcohol phase being recycled to the first phase separation if desired. The diluent-polyolefin slurry is then filtered or centrifuged to separate the solid polyolefin and the latter is dried in the conventional manner usually at a somewhat elevated temperature in a tray or drum drier.

While the present invention in its broadest scope is applicable to recovery of a wide variety of polymers and copolymers of olefins prepared through the agency of a Ziegler catalyst, for the sake of convenience, the invention is illustrated in the following examples with reference to the recovery of polyethylene. It is by no means, however, to be considered as limited in any manner whatsoever by virtue of these examples. All parts given are parts by weight.

EXAMPLE 1

A Ziegler catalyst was prepared by reacting titanium tetrachloride with diisobutylaluminum hydride in a quantity of n-hexane. The resulting catalyst suspension having an Al/Ti mole ratio of about 0.8 was then transferred with additional n-hexane to a polymerization vessel equipped with agitating and cooling means. Ethylene containing about 1% by weight of butene-1 as a comonomer was bubbled through the catalyst while the temperature was maintained from about 70° to about 80° C. and the pressure from about 15 to about 30 p.s.i.g. for a period of about 1.5 hours.

At the end of the reaction period, about 1700 parts of reaction mixture containing approximately 19% solids comprised of the catalyst and polyethylene dispersed as a slurry of fine particles in the n-hexane diluent was transferred to a quench vessel with precaution being taken to exclude air and moisture. In the quencher or digester, about 250 parts of dry methanol were added to the reaction mixture and the whole was agitated while the temperature was maintained at about 90° C. for a period of about 30 minutes. The slurry was then cooled to about 30° C. and contacted with a stream consisting essentially of 68 parts of water and 272 parts of methanol after which it was transferred to a decanter where it was allowed to separate into two phases: a hexane-polyethylene slurry phase and a methanol-water extract phase.

The latter phase was discarded and the hexane-polyethylene slurry phase was contacted with 180 parts of dry methanol and the resulting suspension of solid polyethylene in a single liquid phase was mixed thoroughly in a tank equipped with a mixing device. About 100 parts of water was then added to the thoroughly mixed slurry, two liquid phases were obtained, and the whole was transferred to a decanter for separation of the hexane-polyethylene slurry phase from the methanol-water extract phase. Thereafter, the hexane-polyethylene slurry phase was filtered to separate the polyethylene from the hexane. After drying by conventional means, the polyethylene was found upon analysis to contain <10 p.p.m. of titanium and <10 p.p.m. of chlorine.

EXAMPLE 2

A reaction mixture consisting of solid particles of polyethylene and a Ziegler catalyst complex of the type described in Example 1 suspended in a quantity of n-hexane was obtained by copolymerizing ethylene containing a minor amount of butene-1 using the same reaction conditions and the same procedure described in Example 1. This polymerizate was charged to a quenching vessel and approximately 420 parts of anhydrous methanol were added to it while it was continuously agitated and maintained at a temperature of 90° C. for about 30 minutes. The slurry was then cooled to about 30° C. and contacted with a stream consisting essentially of 60 parts water and 240 parts of methanol with thorough mixing. The resulting two phases were separated, the methanol-water extract phase was discarded, and the hexane-polyethylene slurry phase was filtered to recover the polyethylene. After drying by conventional means, the polyethylene was analyzed and found to contain 32 p.p.m. of titanium and 51 p.p.m. of chlorine.

It is evident from a comparison of Examples 1 and 2 that the total amount of alcohol employed which was about the same in both of these examples is not the critical factor in the removal of catalyst residues. It is the distribution of the methanol in two separate stages or treatment, one at an elevated temperature and the other at a comparatively low temperature, as described in Example 1 which effects the distinct improvements in removal of catalyst residues realized by the process of the present invention.

EXAMPLE 3

A Ziegler catalyst suspension formed by reacting diisobutylaluminum hydride with titanium tetrachloride in n-hexane was introduced with additional n-hexane into a polymerization reactor. Ethylene together with about 0.1% by weight of hydrogen as a modifier for regulation of polymer molecular weight were passed into the catalyst suspended in the hexane reaction medium while the temperature was maintained at about 90-100° C. and pressures from about 50 p.s.i.g. to about 100 p.s.i.g. for about a 2-hour period.

After the polymerization was completed, about 1700 parts of the reaction mixture containing about 18% solids was transferred under an inert atmosphere to a quencher where 240 parts of dry methanol and a small amount of hydroxylamine hydrochloride, a digestion or quenching aid, was added and the mixture was heated with constant agitation at a temperature of 100° C. for about 30 minutes. The reaction slurry was then cooled to about 30° C. and contacted with 56.5 parts of water and 239 parts of methanol after which it was transferred to a decanter where the two phases formed with the addition of the water were allowed to separate. The hexane-polyethylene slurry was removed from the decanter and treated with 180 parts of dry methanol in a mixer. The resulting mixture consisting of polyethylene slurried in a single liquid phase was then contacted with 100 parts of water to produce two phases: a hexane-polyethylene slurry phase and a methanol-water extract phase. These phases were separated by decantation. The hexane-polyethylene slurry phase was filtered to recover the solid polyethylene which was dried and analyzed. The final polyethylene obtained contained <10 p.p.m. of titanium and <10 p.p.m. of chlorine as well.

What is claimed is:

1. In a process for the production of polyethylene by polymerization of ethylene in the presence of a catalytic amount of a catalyst comprising a titanium halide and an organoaluminum compound suspended in n-hexane, the improvement providing for recovery of polyethylene having reduced catalyst residues which comprises quenching the catalyst in the reaction mixture after the polymerization has taken place and before any substantial removal of the polymer from reaction mixture by contacting it with an anhydrous alkyl alcohol containing from 1 to 8 carbon atoms at a temperature from about 90° C. to about 100° C. for a period from about 30 to about 60 minutes; adding water to the quenched reaction mixture to form a hexane-polyethylene slurry phase and an aqueous alcohol phase rich in extracted catalyst residues; separating said phases; contacting said hexane-polyethylene slurry phase with an anhydrous alcohol at temperatures from about 30° to about 40° C.; adding water to the resulting slurry to form a hexane-polyethylene slurry phase and an aqueous alcohol extract phase; separating said phases; filtering the hexane-polyethylene slurry phase to recover the solid polyethylene; and drying said polyethylene.

2. The process of claim 1 wherein said alkyl alcohol is methanol.

3. The process of claim 2 wherein the amount of methanol used for quenching the catalyst is from about 5% to about 25% by weight of the reaction mixture, the amount of water added to the quenched reaction mixture is from about 1% to about 10% by weight of the liquid in said mixture, the amount of methanol employed for contacting the hexane-polyethylene slurry phase is from about 5% to about 15% by weight of the diluent in said slurry, and the amount of water added to the methanol-treated, hexane-polyethylene slurry is from about 1% to about 10% by weight of the liquid in said slurry.

4. In a process for the production of polyethylene by polymerization of ethylene in the presence of a catalytic amount of a catalyst comprising titanium tetrachloride and diisobutylaluminum hydride suspended in n-hexane, the improvement providing for recovery of polyethylene having reduced catalyst residues which comprises quenching the catalyst in the reaction mixture after the polymerization has taken place and before any substantial removal of the polymer from the reaction mixture by contacting it with an amount of anhydrous methanol from about 5% to about 25% by weight of said reaction mixture at a temperature from about 90° C. to about 100° C. for a period from about 30 to about 60 minutes; adding to the quenched reaction mixture an amount of water from about 2.5% to about 5% by weight of the liquid in said mixture to form a hexane-polyethylene slurry phase and an aqueous methanol phase rich in extracted catalyst residues; separating said phases; contacting at temperatures from about 30° to about 40° C. said hexane-polyethylene slurry phase with anhydrous methanol in an amount from about 9% to about 12% by weight of the hexane in said slurry; adding to the resulting slurry an amount of water from about 2.5% to about 5% by weight of the hexane therein to form a hexane-polyethylene slurry phase and an aqueous methanol extract phase; separating said phases; filtering the hexane-polyethylene slurry phase to recover the solid polyethylene; and drying said polyethylene.

References Cited

UNITED STATES PATENTS 3,060,162  10/1962  Van den Berg _____ 260—94.9
3,141,009   7/1964  Shuman _____ 260—94.9

JOSEPH L. SCHOFER, Primary Examiner.

LAWRENCE EDELMAN, F. L. DENSON,
Assistant Examiners.